(12) United States Patent
Augenstein et al.

(10) Patent No.: US 8,438,935 B2
(45) Date of Patent: May 14, 2013

(54) SMOOTH BORE, CHORDAL TRANSIT-TIME ULTRASONIC METER AND METHOD

(75) Inventors: Donald R. Augenstein, Pittsburgh, PA (US); Matthew Mihalcin, Pittsburgh, PA (US); Herbert Estrada, Annapolis, MD (US)

(73) Assignee: Cameron International Corporation, Houston, TX (US)

( * ) Notice: Subject to any disclaimer, the term of this patent is extended or adjusted under 35 U.S.C. 154(b) by 35 days.

(21) Appl. No.: 12/736,373

(22) PCT Filed: Apr. 3, 2009

(86) PCT No.: PCT/US2009/002094
§ 371 (c)(1),
(2), (4) Date: Oct. 1, 2010

(87) PCT Pub. No.: WO2009/131621
PCT Pub. Date: Oct. 29, 2009

(65) Prior Publication Data
US 2011/0023621 A1    Feb. 3, 2011

Related U.S. Application Data

(60) Provisional application No. 61/125,015, filed on Apr. 22, 2008.

(51) Int. Cl.
*G01F 1/20* (2006.01)

(52) U.S. Cl.
USPC .................................................. 73/861.18

(58) Field of Classification Search .. 73/861.27–861.29, 73/861.31, 861.22–24
See application file for complete search history.

(56) References Cited

U.S. PATENT DOCUMENTS

| 5,546,813 | A | * | 8/1996 | Hastings et al. | ........... 73/861.29 |
| 5,728,951 | A | * | 3/1998 | Van Cleve et al. | ....... 73/861.354 |
| 6,647,806 | B1 | * | 11/2003 | Estrada et al. | ............. 73/861.28 |
| 7,159,473 | B1 | * | 1/2007 | Bowers | ...................... 73/861.65 |

* cited by examiner

*Primary Examiner* — Jewel V Thompson
(74) *Attorney, Agent, or Firm* — Ansel M. Schwartz

(57) ABSTRACT

An apparatus for analyzing fluid flow in a pipe includes an ultrasonic flowmeter having a plurality of transducers. The apparatus includes a flow element having a completely smooth bore through which the fluid flows, and a plurality of cavities, each of the cavities has one of the plurality of transducers disposed in it and which is in communication with the fluid flowing through the bore. An apparatus for analyzing fluid flow in a pipe includes an ultrasonic flowmeter having a plurality of transducers. The apparatus includes a flow element having a bore with an internal diameter and a surface through which fluid flows, a plurality of cavities each of which has an opening in the surface. Each of the cavities has one of the plurality of transducers disposed in it.

19 Claims, 9 Drawing Sheets

FIG.4A  LINER

SMOOTH BORE, CHORDAL TRANSIT-TIME ULTRASONIC METER AND METHOD

FIELD OF THE INVENTION

The present invention is related to analyzing fluid flow in a pipe using an ultrasonic flowmeter having a plurality of transducers and a flow element having a completely smooth bore through which the fluid flows. (As used herein, references to the "present invention" or "invention" relate to exemplary embodiments and not necessarily to every embodiment encompassed by the appended claims.) More specifically, the present invention is related to analyzing fluid flow in a pipe using an ultrasonic flowmeter having a plurality of transducers and a flow element having a completely smooth bore through which the fluid flows where the flow element has cavities that receive transducers of the flowmeter, and a liner that covers openings of the cavities in the bore.

BACKGROUND OF THE INVENTION

This section is intended to introduce the reader to various aspects of the art that maybe related to various aspects of the present invention. The following discussion is intended to provide information to facilitate a better understanding of the present invention. Accordingly, it should be understood that statements in the following discussion are to be read in this light, and not as admissions of prior art.

Transit-time chordal ultrasonic meters determine volumetric flow by numerically integrating fluid velocities measured on two, four or more chordal paths. In larger meters the results of this numerical integration of measured velocities usually accord closely with the actual volumetric flow-meter factors that account for the difference between theoretical and actual flow rates typically will lie within a few tenths of a percent of 1.000.

In meters having smaller internal diameters with larger transducer cavities the agreement between the theoretical and actual is not as good when Reynolds Numbers are below about 500,000. Deviations approach 1%, and vary with the Reynolds Number. FIG. 1 illustrates the problem. It plots meter factor data for a collection of meters ranging in internal diameter from 4 inches to 10 inches against Reynolds Number. At a Reynolds Number of about 500,000, the meter factors are close to theoretical (i.e., 1.000) but as Reynolds Number diminishes from this figure, the departure from theory increases to a maximum of about 0.8% at Reynolds Numbers in the 30,000 to 50,000 range.

Experimental data-specifically the response of the chordal velocities to changes in Reynolds Number—show that the cause of this non-linear response of meter factor to changing Reynolds Number has to do with the response of the flow field (the fluid velocity profile) to the geometry of the transducer cavities. That geometry is shown for a typical 4 path meter in FIG. 2. At low to intermediate Reynolds Numbers, components of the fluid velocity enter the cavities, projecting onto the acoustic paths in such a way as to cause the fluid velocity seen by a path to be higher than that which would prevail if the cavities did not exist. The effect is greatest on chords furthest from the centerline. As can be seen in FIG. 2 the geometry of the downstream cavities for the outer paths of a 4-path meter would particularly lend itself to such a response.

The degree to which this distortion of the flow field occurs depends on Reynolds Number, probably because the attachment (or separation) of the boundary layer in the vicinity of the cavities depends on the relative magnitudes of the local inertial and viscous forces. At any rate, the higher-than-expected chordal velocities require meter factors less than the theoretical (1.000) to correct them, the amount of the correction varying with Reynolds Number.

The nonlinear dependence of meter factor on Reynolds Number presents a calibration problem. If such a meter is applied to the accurate measurement of the flows of products have differing viscosities or if the application covers a wide range of flows, the range of Reynolds number to which that meter will be subjected will be broad and is likely to include the range in which the meter factor is sensitive to the value of the Reynolds Number. Accordingly, the meter must be calibrated in a facility that has the capability to vary Reynolds Number over a wide range so as to establish the Meter Factor-Reynolds Number relationship with precision. Such facilities are rare; only two are known to exist in the United States.

Furthermore, the algorithm for the meter itself must include a provision for a Reynolds Number correction, and must receive an input from which it can determine kinematic viscosity (the other components of Reynolds Number, internal diameter and fluid velocity, are already available in the meter). Fluid viscosity is not easy to measure and is usually inferred from other variables, such as fluid density or sound velocity and temperature. The accuracy with which these variables are measured and the accuracy of the empirical relationship between them and the fluid viscosity affects the accuracy of the Reynolds number determination, and therefore the accuracy of the adjustment to the "raw" meter factor.

The dependence of meter factor, in meters of 10 inch internal diameter and smaller, on Reynolds Number thus leads to increased expense (to perform the special calibrations needed to characterize the meter factor) as well as to reduced accuracy (because of the uncertainties associated with the correction of the meter factor with a Reynolds Number inferred from data in the field).

BRIEF SUMMARY OF THE INVENTION

The present invention pertains to the analysis of flowing fluid through a pipe. The analysis is performed with an ultrasonic flowmeter having transducers that are disposed in cavities of a flow element. The fluid in the pipe flows through the flow element, during which time the flowmeter analyzes the flowing fluid.

BRIEF DESCRIPTION OF THE SEVERAL VIEWS OF THE DRAWING

In the accompanying drawings, the preferred embodiment of the invention and preferred methods of practicing the invention are illustrated in which:

FIGS. 4a and 4b are representations of a liner arrangement for "smooth bore" ultrasonic meter.

DETAILED DESCRIPTION OF THE INVENTION

Figure 4B:
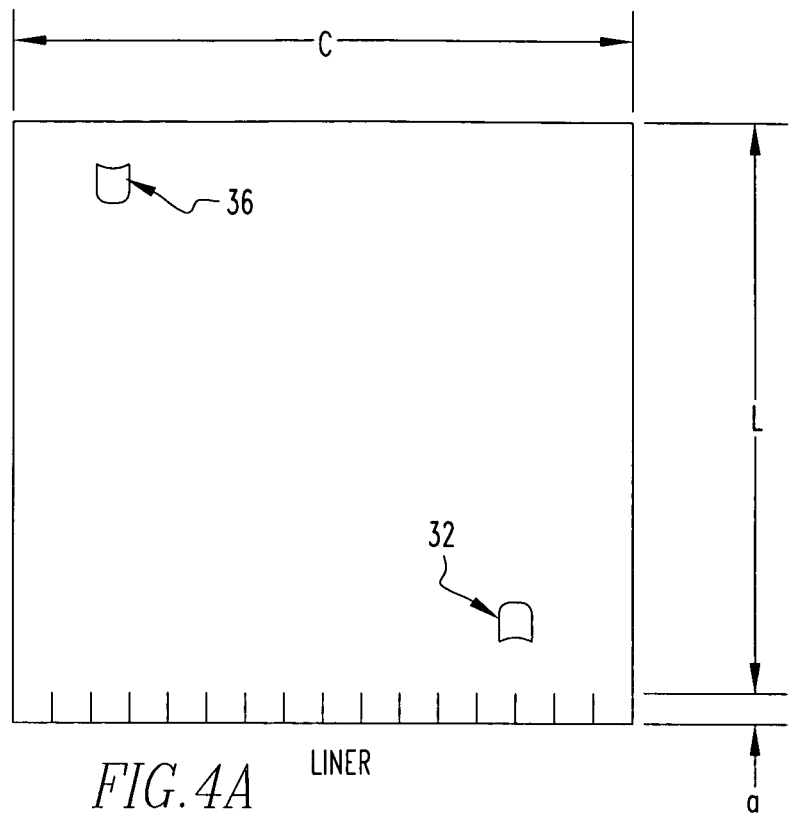
Figure 4B:
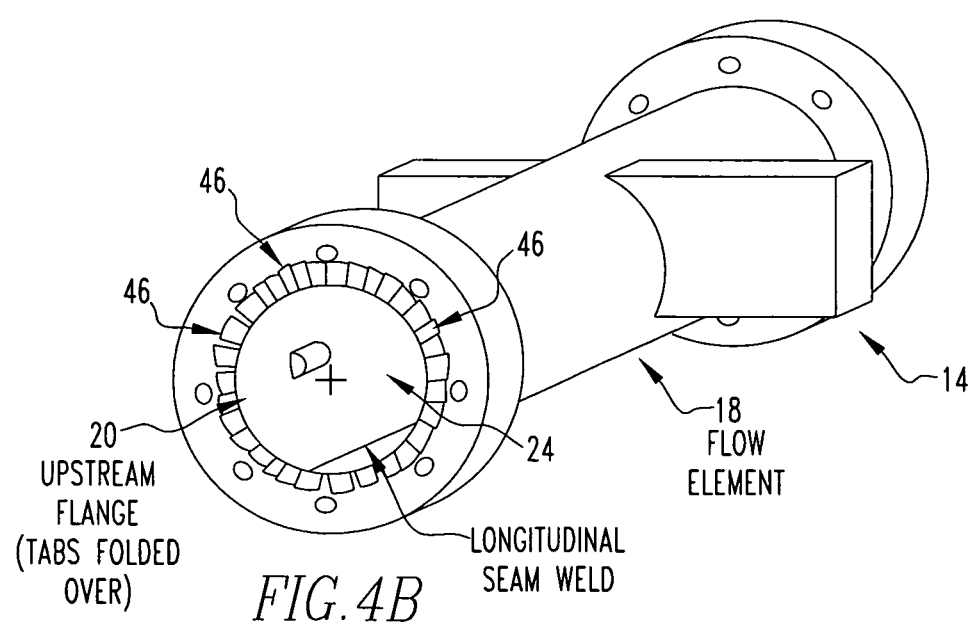
Figure 5:
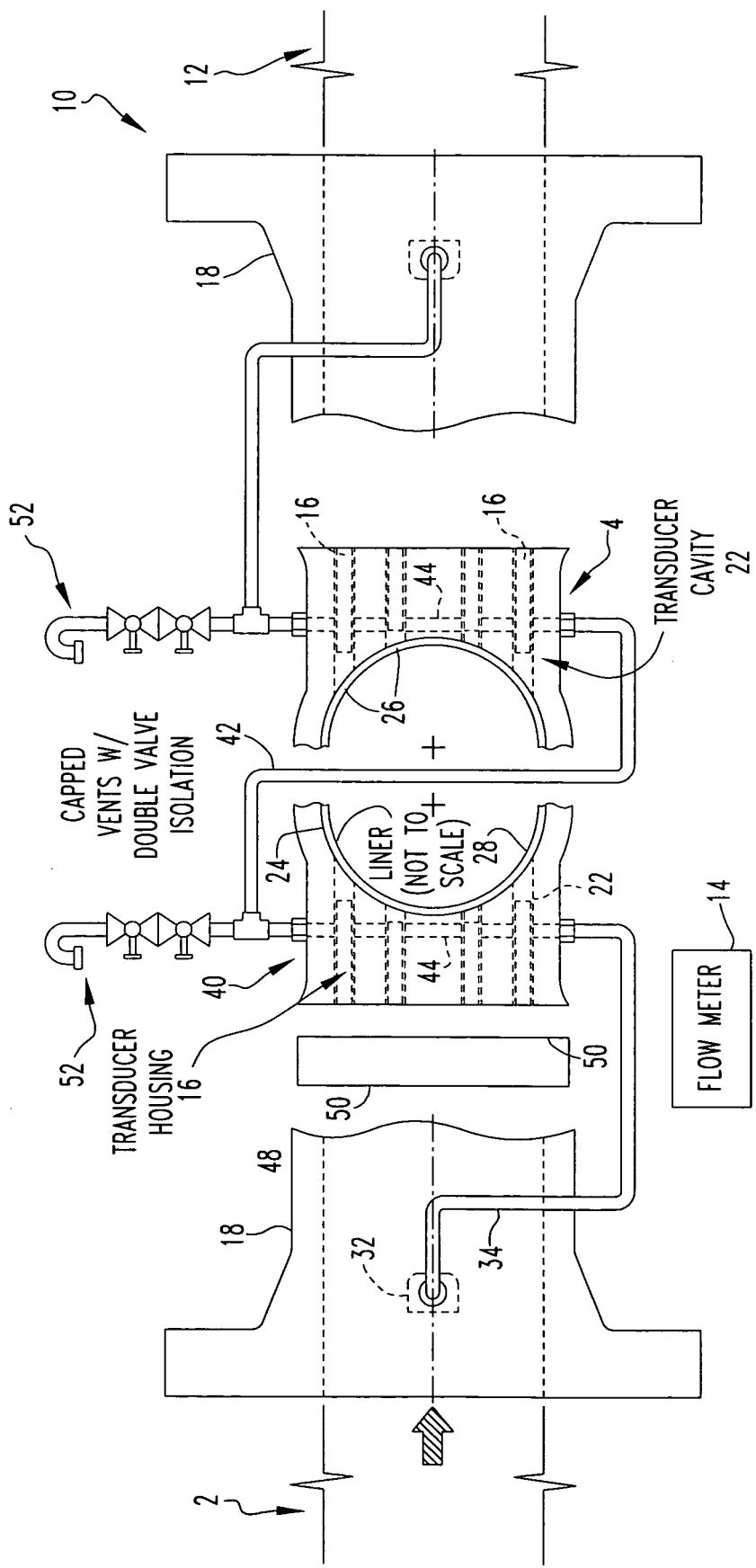
FIG. 5 is a representation of the apparatus of the present invention.

Referring now to the drawings wherein like reference numerals refer to similar or identical parts throughout the several views, and more specifically to FIGS. 4*b* and 5 thereof, there is shown an apparatus 10 for analyzing fluid flow in a pipe 12. The apparatus 10 comprises an ultrasonic flowmeter 14 having a plurality of transducer 16. The apparatus 10 comprises a flow element 18 having a completely smooth bore 20 through which the fluid flows, and a plurality of cavities 22, each of the cavities 22 has one of the plurality of transducer 16 disposed in it and which is in communication with the fluid flowing through the bore 20.

The present invention pertains to an apparatus 10 for analyzing fluid flow in a pipe 12. The apparatus 10 comprises an ultrasonic flowmeter 14 having a plurality of transducer 16. The apparatus 10 comprises a flow element 18 having a bore 20 with an internal diameter and a surface 24 through which fluid flows, a plurality of cavities 22 each of which has an opening 26 in the surface 24. Each of the cavities 22 has one of the plurality of transducer 16 disposed in its. The apparatus 10 comprises a liner 28 that covers the openings 26 of the cavities 22 which prevents fluid flowing through the bore 20 from entering the cavities 22.

The apparatus 10 can include a keep full system 30 in fluid communication with the cavities 22 that fills the cavities 22 with fluid that also flows through the element 18. The keep full system 30 can include an intake scoop 32 disposed in the pipe 12 upstream from the element 18, and upstream tubing 34 in fluid communication with the intake scoop 32 and the cavities 22 through which flowing fluid in the pipe 12 flows through the cavities 22. The keep full system 30 can also include an outtake scoop 36 disposed in the pipe 12 downstream from the elements 18, and downstream tubing 38 in fluid communication with the outtake scoop 36 and the cavities 22 through which fluid flowing through the cavities 22 is discharged into the pipe 12. The element 18 can have a fluid path 40 extending through the cavities 22 and in fluid communication with the upstream tubing 34 and the downstream tubing 38 through which fluid flows through the cavities 22. There can be intermediate tubing 42 that connects channels 44 through the cavities 22. The flow path can have capped vents with double valve isolation 52.

The liner 28 can include a plurality of strips 46 attached to the element 18. The liner 28 can be acoustically invisible with respect to the transducer 16. The liner in one embodiment is made of steel. The thicknesses of the liner 28 can be between 0.001 inches and 0.010 inches. There can be a strainer 48 disposed upstream of the cavities 22. The strainer 48 can include at least two screens 50.

The present invention pertains to a method for analyzing fluid flow in a pipe 12. The method comprises the steps of flowing fluid through a flow element 18 having a completely smooth bore 20, and a plurality of cavities 22. There is the step of determining the fluid flow with transducer 16 of an ultrasonic flowmeter 14 disposed in the cavities 22.

The flowing step can include the step of flowing fluid though the smooth bore 20 having a liner 28 that covers the openings 26 of the cavities 22 which prevents fluid flowing through the bore 20 from entering the cavities 22. There can be the step of filing the cavities 22 with fluid that also flows through the element 18. The filing step can include the step of flowing fluid from the pipe 12 into an intake scoop 32 disposed in the pipe 12 upstream from the element 18, and through upstream tubing 34 in fluid communication with the intake scoop 32 and the cavities 22 through which flowing fluid in the pipe 12 flows through the cavities 22.

The filing step can include the step of flowing fluid from the cavities 22 through downstream tubing 38 in fluid communication with the cavities 22 and discharging the fluid from the cavities 22 into the pipe 12 through an outtake scoop 36 in communication with the downstream tubing 38. The filing step can also include the step of flowing fluid along a fluid path 40 extending through the cavities 22 and in fluid communication with the upstream tubing 34 and the downstream tubing 38 through which fluid flows through the cavities 22. There can be the step of flowing fluid in the pipe 12 through a strainer 48 disposed upstream of the cavities 22.

In the operation of the invention, the meter factors of conventional chordal transit-time ultrasonic flow meters can vary with Reynolds Number, thereby increasing the uncertainty of their calibrations as well as the complexity of the calibration process. This invention involves a configuration for a transit-time chordal ultrasonic meter that eliminates this dependence of meter factor on Reynolds Number and improves the maintainability of multi-chord ultrasonic flow meters.

Figure 1:
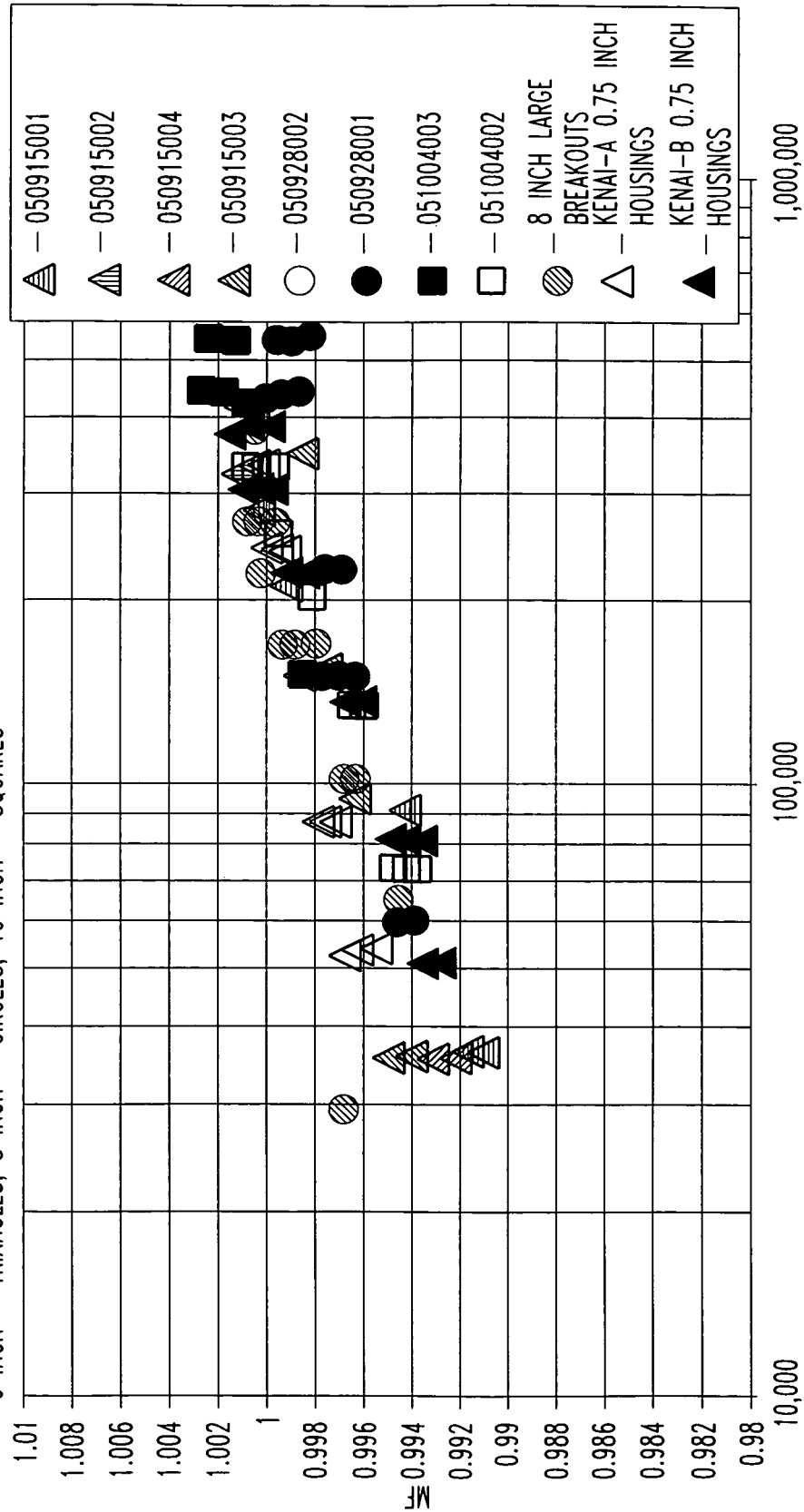
FIG. 1 is a graph of meter factor linearity for typical prior art 4-path chordal meters of 10 inch internal diameter and smaller.
Figure 2:
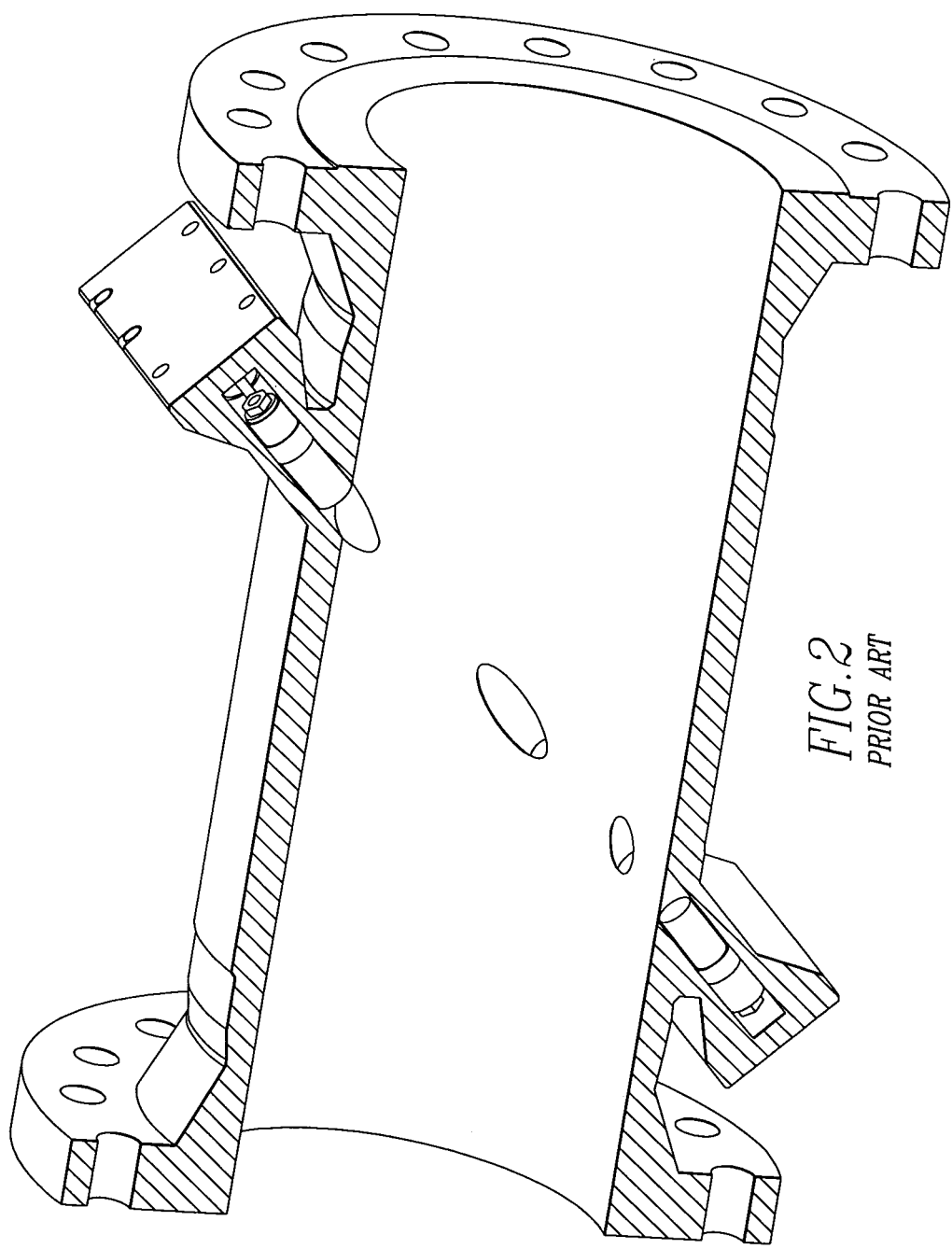
FIG. 2 is a prior art configuration of a typical 4-path conventional ultrasonic meter showing the apertures formed by the cavities containing the transducer housings.

Transit-time flow meters determine fluid velocity by clocking the times of pulses traveling diagonally upstream and downstream between pairs of transducer 16. In a conventional chordal flowmeter 14 the transducer 16 are located in cavities 22 which intersect the internal diameter of the flow element 18. The geometry of the intersection between the transducer cavity and the internal diameter of the flow element 18 is complex because the intersection generally occurs at a chord and not on the centerline. (FIG. 2 shows a typical intersection configuration.) The openings 26 resulting from the intersection of the transducer cavities 22 and the internal diameter of the flow element 18 act as apertures for the transmission and reception of the ultrasonic energy. There is a dependence of meter factor on Reynolds Number arising solely because of the interaction of the flowing fluid with the cavities 22.

Figure 3:
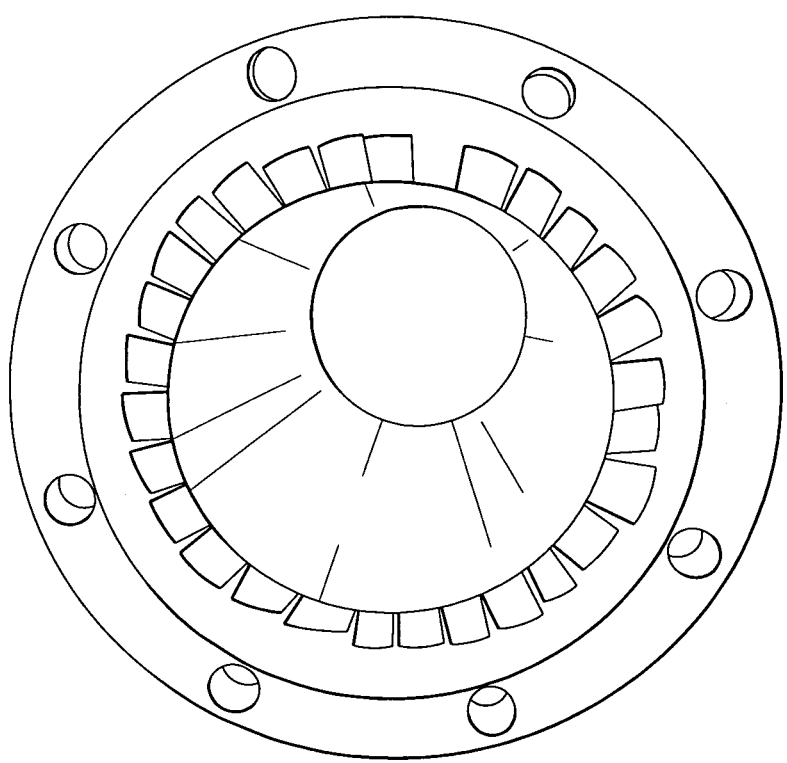
FIG. 3 is a photograph of a "smooth bore" 4-path chordal ultrasonic meter.

The configuration of the invention disclosed herein is shown in the photograph of FIG. 3, and diagrammed in FIGS. 4*a* and 4*b*. Essentially, the invention eliminates the fluid interaction with the cavities 22 by liner 28 the internal diameter of the flow element 18 with a thin metal foil. The configuration is referred to herein as a "smooth bore" meter, since the flowing fluid experiences no disturbance from the walls of the flow element 18 through which it flows.

The cavities 22 behind the foil are filled with the process liquid using a "keep-full" system such as that shown in FIG. 5. The process fluid has the same nominal physical characteristics and is at the same nominal pressure as the process fluid. Thus the liner 28 covering the cavities 22 experiences no significant pressure load and serves only to eliminate interaction between the flowing process fluid and the fluid in the cavities 22.

FIG. 5 shows the flow element's 18 upstream entrance showing the intake scoop 32. Also is shown the flow element 18 including transducer cavities 22 and transducer housings, and the flow element 18 downstream exit showing the outflow scoop.

In the flowmeter 14 configuration disclosed herein, the ultrasonic energy must travel, for each acoustic path, from a transmitting transducer:

(1) Through the essentially stagnant fluid in the cavity in front of the transmitting transducer,
(2) Through the liner 28 that separates that cavity from the flowing fluid,
(3) Through the flowing fluid itself, thence
(4) Through the liner 28 that separates the cavity of the receiving transducer from the flowing fluid,
(5) Through the receiving transducer cavity to the receiving transducer.

The well known algorithm used by the flowmeter 14 to convert transit-times to fluid velocity requires that the energy reaching the receiving transducer be sufficient for reliable pulse detection and that the acoustic path described above be predictable. The following is thus applicable.

(a) The liner 28 should be acoustically invisible. That is, it should respond to ultrasound as a compliant diaphragm, the energy transmission unaffected by the properties of the liner 28 material. To meet this requirement, the wavelength of the acoustic energy in the liner 28 should be much longer than the liner 28 thickness.

(b) The algorithm of chordal flow meters assumes that energy entering the fluid from a transmitting transducer reaches a receiving transducer via a straight line connecting the two. Differences in the acoustic properties of the fluid behind the liner 28 and the process fluid will cause refraction, and therefore deflection of the transmitted energy, reducing the amount of transmitted energy traveling the algorithm path. The differences in properties should be limited such that the fraction of the transmitted energy that reaches the receiving transducer is sufficient for reliable signal detection.

(c) One configuration of the disclosed invention employs a "keep-full" system that uses the velocity head of the process fluid to drive that fluid through the cavities 22 behind the liner 28 (The arrangement is shown in FIG. 5). The principal purpose of this arrangement is assurance that differences between the cavity fluid properties and the process fluid properties, if any, meet the requirements of (b) above. However, the "keep-full" arrangement of FIG. 5 constitutes a fluid path 40 that bypasses the ultrasonic flow measurement (fluid flow through the cavities 22 is, on average, normal to the acoustic beam and therefore is not "seen" by the transiting ultrasound). The amount of flow bypassing the measurement should not materially affect the accuracy of the flow measurement, under all operating conditions.

Tests to confirm the efficacy of the disclosed invention employed the configuration shown in FIG. 3. This configuration used a 300 series stainless steel liner material. The wavelength of the ultrasound $\lambda$ is given by the quotient of the propagation velocity C and the frequency of the ultrasound, f.

$$\lambda = C/f. \tag{C1}$$

To determine the maximum liner 28 thickness constraint, the minimum wave length is required, hence the lowest propagation velocity and the highest frequency. For the stainless steel liner, the lowest propagation velocity for the ultrasound is that of a shear stress wave at about 125,000 inches/sec (The propagation velocity for a longitudinal stress wave is about 1.8 times greater). The upper end of the frequency of ultrasound used for the measurement of fluid flow is about 2 MHz. Hence the minimum wave length of ultrasound in the stainless steel liner is $\lambda=125{,}000/2{,}000{,}000=0.0625$ inches (1/16 inch). Acoustic "transparency" requires that the liner be smaller than 1/4 of this figure. Several liner 28 thicknesses were tested to determine how much they attenuated the transmitted wave. It was found that liners ranging in thickness from 0.001 inches to 0.010 inches did not significantly attenuate the ultrasound. On the other hand, a liner thickness of 1/8 inch (two wavelengths) was found to produce unacceptably high attenuation. For the flow tests of the invention a thickness of 0.005 inches was chosen—this thickness provided reasonable structural integrity as well as acceptably small attenuation.

The refraction of the acoustic wave at the boundary between cavity and process fluids is determined by the geometry of the intersection and the sound velocities of the cavity fluid and the process fluid. If a keep-full system, such as that of FIG. 5 is employed, the two sound velocities will be equal in the steady state, but the time lag between properties of the fluid in the cavities 22 and the properties of the process fluid can cause differences to arise. (The time lag occurs because the fluid velocity through the keep-full system is much lower than that through the meter. For the analysis described in subsequent paragraphs, the sound velocity of the cavity fluid $C_{CAVITY}$, was assumed to follow that of the process $C_{FLUID}$ according to a first order differential equation: $C_{FLUID} = \tau d/dt$ $(C_{CAVITY}) + C_{CAVITY}$. Here $\tau$ is the time constant of the keep-full system which is approximated by its volume divided by its flow.) Process fluid sound velocity will change with its temperature which can vary in time. Additionally, in a multi-product pipeline, the sound velocity of a batch can and usually does differ from the batch which preceded it. The keep full system 30 must ensure that the sound velocity differences do not disrupt the meter's operation.

Figure 6:
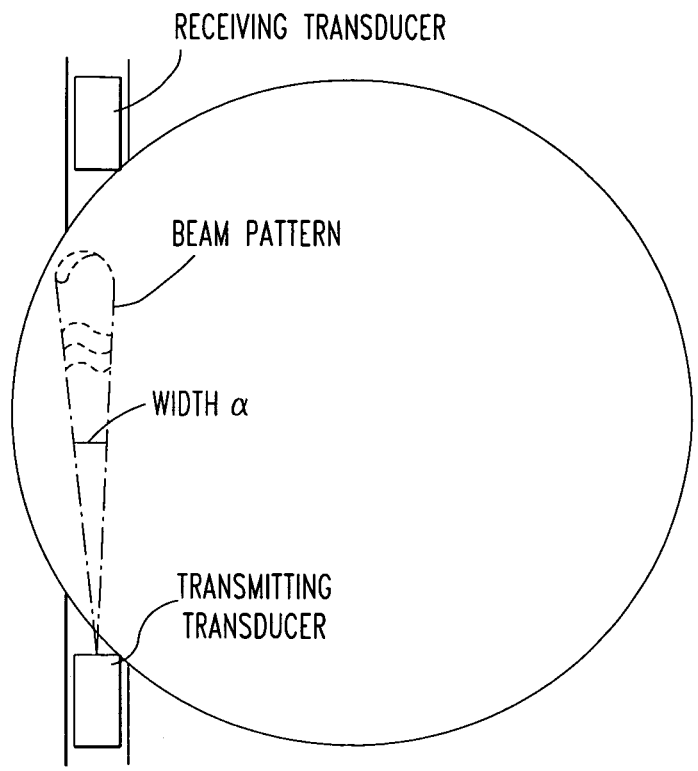
FIGS. 6 and 7 show the energy transmission geometry of the outer chordal path of a 4-path meter.

The geometry of the refraction boundary is complex (Refer again to FIG. 2). For a 4 path chordal meter, the plane containing the four acoustic paths is most limiting, with the outer paths having a more constraining geometry than the inner paths. An enlarged view of the outer path geometry is shown in FIG. 6. The boundary between the cavity fluid and the process fluid (maintained by the liner 28) defines the angle of refraction. The angle of an incident ray in medium 1 relative to a normal to this boundary, $\theta_1$, is related to the angle of the refracted ray relative to the same normal, $\theta_2$, by Snell's law. This law states that:

$$\sin\theta_1/C_1 = \sin\theta_2/C_2 \tag{C2}$$

Here $C_1$ and $C_2$ are the sound propagation velocities in the incident medium (the cavity fluid) and the refraction medium (the process fluid) respectively. The difference between the incident angle and the refraction angle, $\partial\theta_2$, owing to a difference between the propagation velocities in the cavity and the process fluid, $\partial C_2$, is given by:

$$\partial\theta_2 = \tan\theta_1\, \partial C_2/C_1 \tag{C3}$$

Figure 7:
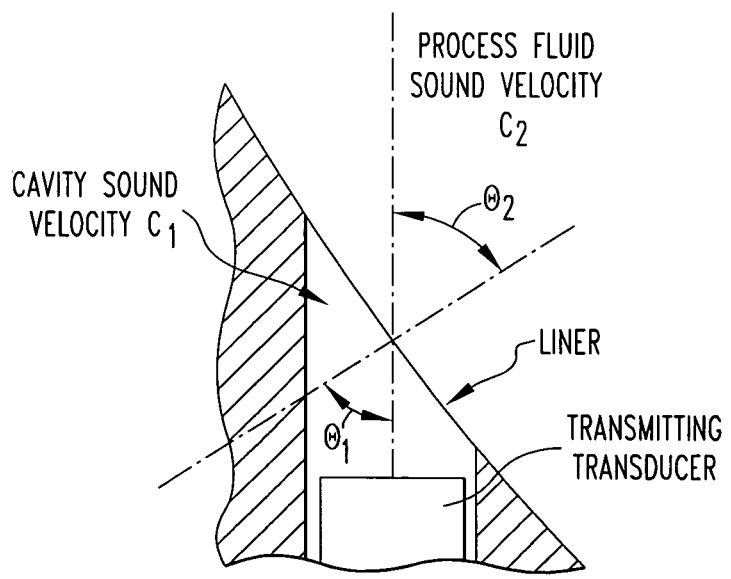

FIG. 7 shows the incident and refraction angles. In a 6 inch 4 path meter with 1/2 inch diameter transducer 16, the incident $\theta_1$ is about 68°. The allowable difference between the incident and refraction angles depends on the transmission beam pattern, shown in FIG. 6. Usually by design the angular width of the beam (given by the angle $\alpha$) is made narrow, so as to maximize the fraction of the transmitted energy that is captured by the receiving transducer. The beam width $\alpha$ is approximated by:

$$\alpha = \lambda/d \text{ radians} \tag{C4}$$

Here $\lambda$ is the wavelength of the ultrasound in the process fluid and
d is the diameter of the cavity A narrow beam width is less tolerant of small changes in refraction angle because a small change in $\theta_2$ can direct most of the transmitted energy away from the receiving transducer. For a 1/2 inch cavity, a typical process fluid sound velocity of 50,000 inches/second and a 2 MHz frequency for the ultrasound, the beam width α is about 3°. A beam deflection of about a will bring about a 30% (3 dB) reduction in the received signal. Using ½ α and the geometry of FIG. 6 as a conservative basis for the acceptable difference between cavity sound velocity and process fluid sound velocity, a difference of about 500 inches per second is calculated. This figure is about 1% of the sound velocity for a typical petroleum product and corresponds to about a 5° F. change in the temperature of that product.

Figure 8:
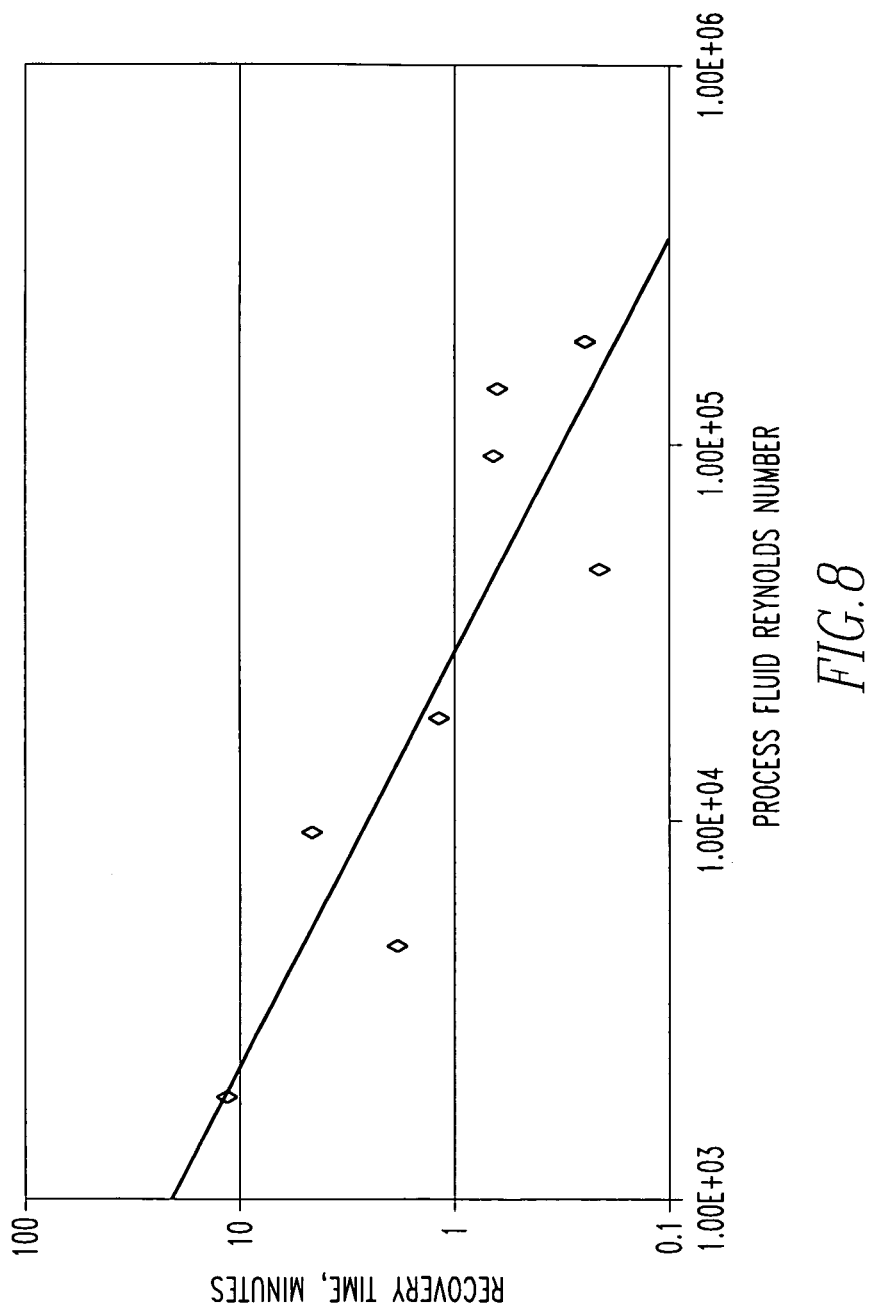
FIG. 8 is a graph of the recovery time for a 10% step change in product sound velocity for the keep-full system of FIG. 5.
Figure 9:
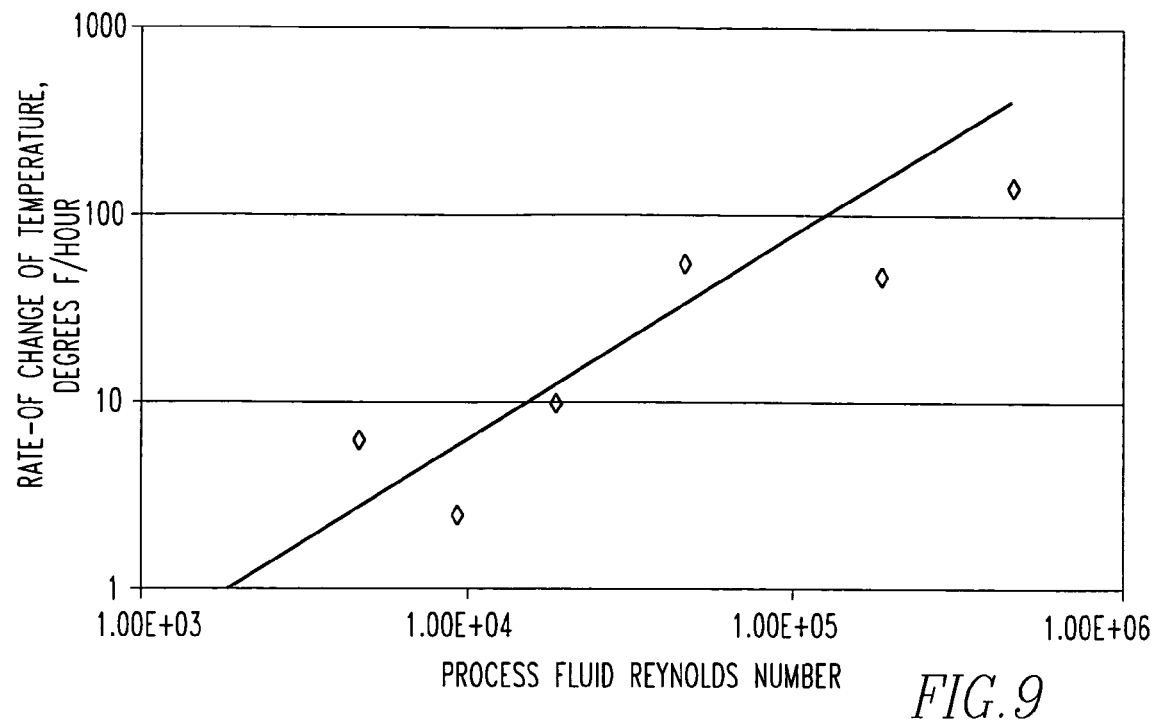
FIG. 9 is a graph of the rate of change of product temperature to produce a 3 dB reduction in signal strength for keepfull system of FIG. 5.

What does this limitation mean in terms of meter performance? FIGS. 8 and 9 answer this question. FIG. 8 plots the time to recover the received signal to within 3 dB (70%) of the magnitude prevailing prior to a 10% change in product sound velocity. A typical sound velocity for a petroleum product is about 50,000 inches/second. A 10% change (5,000 inches/second) is representative of the difference in sound velocities between say diesel fuel and gasoline. FIG. 8 indicates that, for the Reynolds Numbers likely to prevail in a multi-product pipeline (50,000 or greater) recovery to within 3 dB will occur in less than 1 minute.

It should be noted that a received signal attenuated by more than 3 dB will not necessarily cause the meter to malfunction; the meter accuracy may however be less than its design value for the period when the signal strength is beyond this bound.

FIG. 9 shows the rate of change of product temperature that can be accommodated by the Keep-Full system of FIG. 5 while maintaining the received signal within 3 dB of its nominal value. Product temperature changes typically occur because of changes in ambient temperature, which impact product temperature in an above-ground pipeline, and which are typically slow. FIG. 9 shows that the most limiting allowable rates-of-process temperature change occur with low Reynolds Numbers. In real applications, low Reynolds Numbers—in the 10,000 to 20,000 range—can occur in small pipelines carrying heavy crude. FIG. 9 shows that temperature changes in the 10° F./hour range will not cause an acceptable loss of signal strength. Typical changes in product temperature due to day-night temperature changes are well below this value.

Figure 10:
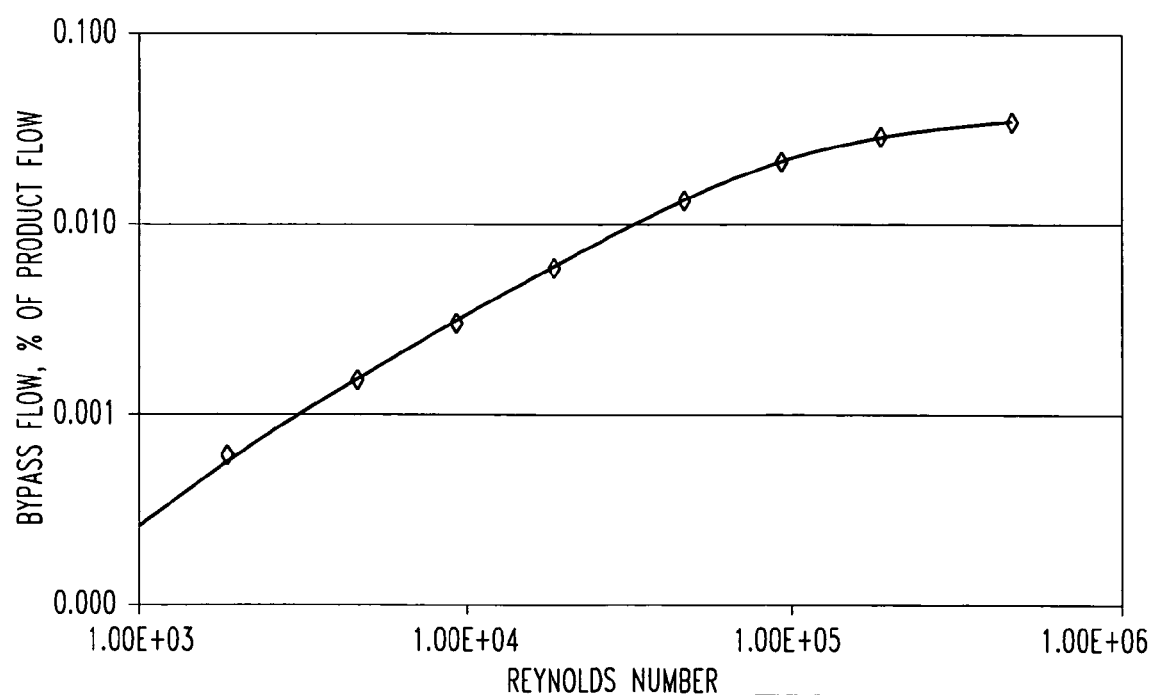
FIG. 10 is a graph of bypass flow vs. product Reynolds Number.

FIG. 10 shows the bypass leakage through the Keep-full system of FIG. 5 as a function of product Reynolds Number. For all Reynolds Numbers in which the invention disclosed herein might be applied (5,000 to 500,000) the bypass leakage is less than 0.03% of the flow passing through the meter. This potential error due to bypass flow can be corrected for in either the meter or the installation. Furthermore, should specific applications require more rapid response of cavity fluid sound velocity to changes in process fluid sound velocity, the flow rate of the "keep-full" system could be increased (by increasing the diameter of the flow passages of the system).

For the proof-of-principle tests, the cavities 22 were filled with process fluid using a manual procedure of valves and tubing. The cavity fluid was therefore close to the process fluid both in chemical properties and temperature—probably within 100 or 200 inches/second. Throughout the tests, signal strength remained acceptable.

Figure 11:
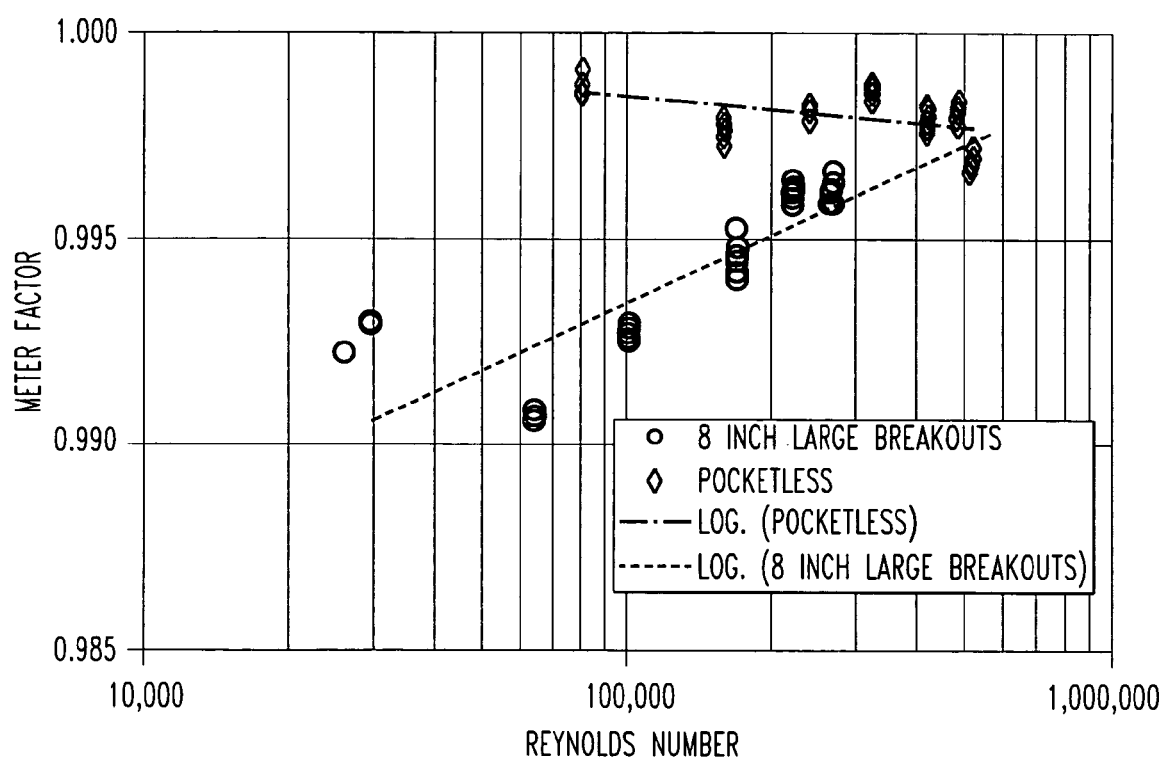
FIG. 11 is a graph of the meter factor linearity of the "smooth bore" 4-path chordal meter versus that for 4-path meters having a conventional cavity configuration.

FIG. 11 shows the dependence of meter factor of the smooth bore 20 meter of FIG. 3 on Reynolds Number. Also shown is the meter factor of a typical conventional chordal meter (where the cavities 22 are exposed to the process fluid flow). The improvement in linearity is pronounced. While the conventional meter shows a variation in meter factor with Reynolds Number approaching 0.8%, the sensitivity of the smooth bore 20 meter is less than 0.1%. Moreover, this small sensitivity is predictable—the theoretical sensitivity of the quadrature numerical integration to developed profiles in the Reynolds Number range of the figure is about 0.1% declining. A correction for this small non linearity does not require a Reynolds Number measurement; it can be affected using the chordal velocity measurements of the meter itself, specifically the ratio of the outer chord velocities to the inner chord velocities.

The liner 28 material should be tough, to resist abrasion, and corrosion resistant, to prevent changes in surface 24 roughness. It should be readily available in sheets having the thicknesses meeting the wave length specifications described above—about 0.005 inches for the stainless steel liner used in the testing. Candidate materials are: 300 series stainless steel, titanium, and Inconel. It should be noted that the dimensional specifications for chordal locations must take account of the liner's effect on the internal diameter of the meter. It should also be noted that no finish machining is required on the internal diameter or the transducer bores 20, since the flow field through the meter does not interact with these surfaces 24.

For production meters the liner 28 would be affixed by tabs to the front flange of the flow element 18 as shown in FIG. 3 and as was done in testing. The seam weld would be made as small as possible and located away from any of the acoustic paths, as shown in FIG. 4b. A rolling process (similar to rolling tubes into a tubesheet, but on a much larger scale) would ensure that the gap between the base metal of the flow element 18 and the liner 28 was minimized. Two circumferential bands of an epoxy adhesive, resistant to attack from petroleum products and located near the leading and trailing edges of the liner 28, provides additional assurance that the band would remain fixed in position.

The specifications for the design of the keep-full system are discussed above, specifically:

a. The flow rate through the keep-full system should refresh the fluid in the cavities 22 between the transducer housings and the liner 28 quickly enough to limit the difference between the sound velocity of the cavity fluid and the sound velocity of the flowing product under transient conditions. The difference in the cavity and product sound velocities should not be allowed to become large enough to prevent the transmitted ultrasonic beam from "illuminating" the receiving transducer (that is, the refraction of the beam at the cavity/product interfaces must be limited to an acceptable value). This requirement sets a minimum acceptable keep-full flow rate. The most limiting condition to which this requirement applies will normally occur at the minimum product flow rate and the maximum product viscosity both of which will act to reduce keep full flow (by the reducing the driving head and by increasing the resistance of the keep full loop, respectively).

b. The flow through the keep full system 30 is not measured by the chordal ultrasonic meter and hence constitutes an error in its flow measurement. Although the magnitude of the error may be reduced by an estimate of the keep full flow, the bypass flow should nevertheless be limited to ensure that the meter complies with its accuracy specification. This requirement sets a maximum keep full flow rate. The most limiting condition to which this requirement applies will normally occur at the maximum product flow rate and the minimum product viscosity both of which will act to increase keep full flow (by increasing the driving head and by reducing the resistance of the keep full loop, respectively).

FIGS. 8, 9 and 10 illustrate the ability of a specific keep full system 30 to comply with these requirements for a range of products, product temperatures, and product Reynolds Numbers (i.e., flow rates and viscosities). The calculated responses on which the figures are based are for a 6 inch, 4 chord meter with the keep full system 30 illustrated in FIG. 5 and having the following characteristics:

Driving head H provided by scoop+discharge $$H = (\text{efficiency})\{(\text{local velocity head facing upstream}) - (\text{local velocity head facing downsteam})\}$$

$$H = \eta[(+\tfrac{1}{2} V^2/g) - (-\tfrac{1}{2} V^2/g)] = \eta\, V^2/g$$

Here $\eta$ is the efficiency of the scoop/discharge arrangement and is taken as 0.7, based on experience with Dahl tube flow meters.

V is the product velocity near the wall of the flowmeter 14, taken as ½ of the mean product velocity g is the gravitational constant The tubing is stainless steel, selected for its ready availability and corrosion resistance. For the 6 inch meter of the sample case, a ¼ inch tubing diameter (0.21 inch tube ID) was selected. For the lengths and configuration required in this meter size, the resistance of the tubing, in combination with the losses for entrance, exit, and bends led to flow rates meeting the criteria of a and b above, over a wide range of operating conditions.

It should be emphasized that the tubing size and other design specifics must be selected as appropriate for each application; larger meters will generally require larger tubing sizes.

The width of the inlet and discharge scoops is about 4 tube diameters; its height is about 1 tube diameter. These dimensions lead to a relatively small disturbance to the flow field, yet capture a large fraction of the local velocity head. The distance between the intake scoop 32 and the acoustic paths of the ultrasonic meter is such that the disturbance to the axial velocity profile created by the scoop will have disappeared by the time the profile is sensed by the ultrasonic pulses. The flow field distortion created by a small disturbance d protruding radially into the flow stream will generally disappear 10 to 20d downstream. This requirement is met by the system shown in FIG. 5. The downstream facing (discharge) scoop must likewise be removed from the flow field sampled by the acoustic paths, though the separation distance need not be as great (a distance of ½ D from the acoustic paths where D is the internal diameter of the flow element 18 is considered adequate.

Other data for the sample keep full system 30 of FIG. 5 on which the performance quoted herein is based are listed below. Resistance and flow calculations were performed using the data of "Flow of Fluids through Valve, Fittings and Pipe," Crane Co. Technical Paper 410, incorporated by reference herein.

Length of tubing, upstream of upstream cavity feeder: 2½ meter diameters (15 inches) maximum. This tubing is run external to the flow element 18 itself as shown in FIG. 5. The pressure stresses in the wall of the flow element 18 itself will not permit this passage to be drilled axially along the flow element 18. However, the 0.25 inch radial penetration connecting the tubing to the intake scoop 32 does not require reinforcement (because of its small size relative to the wall thickness). Reinforcement may be required for this penetration in larger flow elements 18 with larger tubing.

Length of 0.21 inch feeder to four (4) upstream transducer cavities 22, 1 meter diameter (6 inches). The dimensions of the "saddle" that contains the four transducer 16 in Caldon's standard petroleum meter body are such that no reinforcement is required for this feeder.

Length of tubing, connecting upstream cavity feeder to feeder to four downstream transducer cavities 22, 3 meter diameters (18 inches). Because of the complex path, this connection is made external to the meter body itself.

Length of 0.21 inch feeder to four (4) downstream transducer cavities 22, 1 meter diameter (6 inches). As with the upstream header, no reinforcement is required.

Length of tubing connecting the discharge of the downstream feeder to the downstream facing discharge of the keep full system 30, 2½ meter diameters (15 inches) maximum. As with the incoming tubing, this tubing is run external to the flow element 18 itself, for the same reasons. Again, no reinforcement is required for the ¼ inch radial penetration to the discharge.

Number of sudden expansions in keep-full circuit: 9.
Number of sudden contractions in keep-full circuit: 9.
Number of 90° bends in keep-full circuit: 11.

The static pressure within the keep-full system designed as described above will, on average, be about equal the static pressure of the product in the flow element 18 and will never be more than ½ of a velocity head above the static pressure of the product. This pressure difference, 1 or 2 psi, is not capable of producing significant distortion of the liner 28 covering the transducer cavities 22.

It should be noted that the disclosed invention may find application where there is little or no dependence of meter factor on Reynolds Number—that is, in meters larger than 10 inches in internal diameter and at Reynolds Numbers above 500,000. Some process fluids, crude oils particularly, contain waxes and other contaminants that can find their way into the transducer cavities 22. These deposits can attenuate and distort the received signals. The use of a liner 28 and a "keep-full" system provides a means for preventing such deposits.

Certain modifications to the "keep-full" system of FIG. 5 are necessary in such applications, however. Specifically, a strainer 48 could be added to the system at a location downstream of the intake but upstream of the cavities 22 to prevent the keep-full flow from introducing unwanted deposits inside the liner 28. The strainer 48 mesh would be selected to limit the size of particulate contaminants to an acceptable dimension. In all likelihood, a "duplex" strainer 48 design could be used, allowing keep-full flow to be maintained through one basket while the second basket is removed for cleaning, then replaced. Additionally, a design of the "scoop" that serves as an intake to the keep-full system could be different from that of FIG. 5. A flush design at a higher pressure location upstream of the flow element 18 would be desirable (to discourage particulates from collecting and possibly plugging the keep-full piping).

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An apparatus for analyzing fluid flow in a pipe comprising:
   an ultrasonic flowmeter having a plurality of ultrasonic transducers; and
   a flow element having a completely smooth bore through which the fluid flows, and a plurality of cavities separate and apart from the fluid flowing through the bore, each of the cavities has one of the plurality of transducers disposed in it and which is in acoustic communication with the fluid flowing through the bore.

2. An apparatus for analyzing fluid flow in a pipe comprising:
an ultrasonic flowmeter having a plurality of ultrasonic transducers;
a flow element having a bore with an internal diameter and a surface through which fluid flows, a plurality of cavities each of which has an opening in the surface, each of the cavities has one of the plurality of transducers disposed in it; and
a liner that covers the openings of the cavities which prevents fluid flowing through the bore from entering the cavities, the transducers communicating with the flowing fluid through the liner.

3. An apparatus as described in claim 2 including a keep full system in fluid communication with the cavities that fills the cavities with fluid that also flows through the element.

4. An apparatus as described in claim 3 wherein the keep full system includes intake scoop disposed in the pipe upstream from the element, and upstream tubing in fluid communication with the intake scoop and the cavities through which flowing fluid in the pipe flows through the cavities.

5. An apparatus as described in claim 4 wherein the keep full system includes an outtake scoop disposed in the pipe downstream from the elements, and downstream tubing in fluid communication with the outtake scoop and the cavities through which fluid flowing through the cavities is discharged into the pipe.

6. An apparatus as described in claim 5 wherein the element has a fluid path extending through the cavities and in fluid communication with the upstream tubing and the downstream tubing through which fluid flows through the cavities.

7. An apparatus as described in claim 6 wherein the liner includes a plurality of strips attached to the element.

8. An apparatus as described in claim 7 wherein the liner is acoustically invisible with respect to the transducers.

9. An apparatus as described in claim 8 wherein the liner is made of steel.

10. An apparatus as described in claim 9 wherein the thicknesses of the liner is between 0.001 inches and 0.010 inches.

11. An apparatus as described in claim 10 including a strainer disposed upstream of the cavities.

12. An apparatus as described in claim 11 wherein the strainer includes at least two screens.

13. A method for analyzing fluid flow in a pipe comprising the steps of:
flowing fluid through a flow element having a completely smooth bore, and a plurality of cavities separate and apart from the fluid flowing through the bore; and
determining the fluid flow with ultrasonic transducers of an ultrasonic flowmeter disposed in the cavities.

14. A method as described in claim 13 wherein the flowing step includes the step of flowing fluid though the smooth bore having a liner that covers the openings of the cavities which prevents fluid flowing through the bore from entering the cavities, the transducers communicating with the flowing fluid through the liner.

15. A method as described in claim 14 including the step of filing the cavities with fluid that also flows through the element.

16. A method as described in claim 15 wherein the filing step includes the step of flowing fluid from the pipe into an intake scoop disposed in the pipe upstream from the element, and through upstream tubing in fluid communication with the intake scoop and the cavities through which flowing fluid in the pipe flows through the cavities.

17. A method as described in claim 16 wherein the filing step includes the step of flowing fluid from the cavities through downstream tubing in fluid communication with the cavities and discharging the fluid from the cavities into the pipe through an outtake scoop in communication with the downstream tubing.

18. A method as described in claim 17 wherein the filing step includes the step of flowing fluid along a fluid path extending through the cavities and in fluid communication with the upstream tubing and the downstream tubing through which fluid flows through the cavities.

19. A method as described in claim 18 including the step of flowing fluid in the pipe through a strainer disposed upstream of the cavities.

* * * * *